CHECK WORD SEQUENCES

| BIT # | A (X) | | B (XX) | | C (XOX) | | D (XXX) | |
|---|---|---|---|---|---|---|---|---|
| | k'' | k' | k'' | k' | k'' | k' | k'' | k' |
| 1 | X O O | O O O O X | X O X | O O O X X | X X O | O O X O X | X X X | O O X X X |
| 2 | O O X | O O O X O | O X X | O O X X O | X O O | O X O X O | X X O | O X X X O |
| 3 | O X O | O O X O O | X X X | O X X O O | O O X | X O X O O | X O O | X X X O O |
| 4 | X O X | O X O O O | X X O | X X O O O | O X O | O X O O X | O O X | X X O O X |
| 5 | O X X | X O O O O | X O O | X O O O X | X O X | X O O X O | O X O | X O O X X |
| 6 | X X X | O O O O X | O O X | O O O X X | O X X | O O X O X | X O X | O O X X X |
| 7 | X X O | O O O X O | O X O | O O X X O | X X X | O X O X O | O X X | O X X X O |
| 8 | X O O | O O X O O | X O X | O X X O O | X X O | X O X O O | X X X | X X X O O |
| 9 | O O X | O X O O O | O X X | X X O O O | X O O | O X O O X | X X O | X X O O X |
| 10 | O X O | X O O O O | X X X | X O O O X | O O X | X O O X O | X O O | X O O X X |
| 11 | X O X | O O O O X | X X O | O O O X X | O X O | O O X O X | O O X | O O X X X |
| 12 | O X X | O O O X O | X O O | O O X X O | X O X | O X O X O | O X O | O X X X O |
| 13 | X X X | O O X O O | O O X | O X X O O | O X X | X O X O O | X O X | X X X O O |
| 14 | X X O | O X O O O | O X O | X X O O O | X X X | O O O O X | O X X | X X O O X |
| 15 | X O O | X O O O O | X O X | X O O O X | X X O | X O O X O | X X X | X O O X X |
| 16 | O O X | O O O O X | O X X | O O O X X | X O O | O O X O X | X X O | O O X X X |
| 17 | O X O | O O O X O | X X X | O O X X O | O O X | O X O X O | X O O | O X X X O |
| 18 | X O X | O O X O O | X X O | O X X O O | O X O | X O X O O | O O X | X X X O O |
| 19 | O X X | O X O O O | X O O | X X O O O | X O X | O X O O X | O X O | X X O O X |
| 20 | X X X | X O O O O | O O X | X O O O X | O X X | X O O X O | X O X | X O O X X |
| 21 | X X O | O O O O X | O X O | O O O X X | X X X | O O X O X | O X X | O O X X X |
| 22 | X O O | O O O X O | X O X | O O X X O | X X O | O X O X O | X X X | O X X X O |
| 23 | O O X | O O X O O | O X X | O X X O O | X O O | X O X O O | X X O | X X X O O |
| 24 | O X O | O X O O O | X X X | X X O O O | O O X | O X O O X | X O O | X X O O X |
| 25 | X O X | X O O O O | X X O | X O O O X | O X O | X O O X O | O O X | X O O X X |
| 26 | O X X | O O O O X | X O O | O O O X X | X O X | O O X O X | O X O | O O X X X |
| 27 | X X X | O O O X O | O O X | O O X X O | O X X | O X O X O | X O X | O X X X O |
| 28 | X X O | O O X O O | O X O | O X X O O | X X X | X O X O O | O X X | X X X O O |
| 29 | X O O | O X O O O | X O X | X X O O O | X X O | O X O O X | X X X | X X O O X |
| 30 | O O X | X O O O O | O X X | X O O O X | X O O | X O O X O | X X O | X O O X X |
| 31 | O X O | O O O O X | X X X | O O O X X | O O X | O O X O X | X O O | O O X X X |
| 32 | X O X | O O O X O | X X O | O O X X O | O X O | O X O X O | O O X | O X X X O |
| 33 | O X X | O O X O O | X O O | O X X O O | X O X | X O X O O | O X O | X X X O O |
| 34 | X X X | O X O O O | O O X | X X O O O | O X X | O X O O X | X O X | X X O O X |
| 35 | X X O | X O O O O | O X O | X O O O X | X X X | X O O X O | O X X | X O O X X |

k k k k

Fig. 1

INVENTORS
WILLIAM DE LISLE
RAYMOND FRYER
BY F. D. Sullivan
ATTORNEY

DECODING TABLE

| BIT # | P8 | P7 | P6 | P5 | P4 | P3 | P2 | P1 | |
|---|---|---|---|---|---|---|---|---|---|
| 1 | X | o | o | o | o | o | o | X | P1 |
| 2 | o | o | X | o | o | o | X | o | P2 |
| 3 | o | X | o | o | o | X | o | o | P3 |
| 4 | X | o | X | o | X | o | o | o | P4 |
| 5 | o | X | X | X | o | o | o | o | P5 |
| 6 | X | X | X | o | o | o | o | X | P6 |
| 7 | X | X | o | o | o | o | X | o | P7 |
| 8 | X | o | o | o | o | X | o | o | P8 |
| 9 | o | o | X | o | X | o | o | o | M1 |
| 10 | o | X | o | X | o | o | o | o | M2 |
| 11 | X | o | X | o | o | o | o | X | M3 |
| 12 | o | X | X | o | o | o | X | o | M4 |
| 13 | X | X | X | o | o | X | o | o | M5 |
| 14 | X | X | o | o | X | o | o | o | M6 |
| 15 | X | o | o | X | o | o | o | o | M7 |
| 16 | o | o | X | o | o | o | o | X | M8 |
| 17 | o | X | o | o | o | o | X | o | M9 |
| 18 | X | o | X | o | o | X | o | o | M10 |
| 19 | o | X | X | o | X | o | o | o | M11 |
| 20 | X | X | X | X | o | o | o | o | M12 |
| 21 | X | X | o | o | o | o | o | X | M13 |
| 22 | X | o | o | o | o | o | X | o | M14 |
| 23 | o | o | X | o | o | X | o | o | M15 |
| 24 | o | X | o | o | X | o | o | o | M16 |
| 25 | X | o | X | X | o | o | o | o | M17 |
| 26 | o | X | X | o | o | o | o | X | M18 |
| 27 | X | X | X | o | o | o | X | o | M19 |
| 28 | X | X | o | o | o | X | o | o | M20 |
| 29 | X | o | o | o | X | o | o | o | M21 |
| 30 | o | o | X | X | o | o | o | o | M22 |
| 31 | o | X | o | o | o | o | o | X | M23 |
| 32 | X | o | X | o | o | o | X | o | M24 |
| 33 | o | X | X | o | o | X | o | o | M25 |
| 34 | X | X | X | o | X | o | o | o | M26 |
| 35 | X | X | o | X | o | o | o | o | M27 |
| | k" | | | k' | | | | | |

k (P8–P1)

r = 3
k = 8
k' = 5
k" = 3
M ≦ 27

Fig. 2

ENCODING TABLE

| | P1 | P2 | P3 | P4 | P5 | P6 | P7 | P8 |
|---|---|---|---|---|---|---|---|---|
| M1 | X | X | o | X | o | X | X | o |
| M2 | o | X | X | o | X | o | X | X |
| M3 | X | X | X | o | o | o | X | X |
| M4 | X | o | X | o | o | X | X | X |
| M5 | X | o | o | o | o | X | o | X |
| M6 | X | o | o | X | o | X | o | o |
| M7 | o | X | o | o | X | o | X | o |
| M8 | o | o | X | o | o | X | o | X |
| M9 | X | X | o | o | o | X | o | o |
| M10 | o | X | X | o | o | o | X | o |
| M11 | o | o | X | X | o | o | o | X |
| M12 | X | X | o | o | X | X | X | o |
| M13 | o | X | X | o | o | X | X | X |
| M14 | X | X | X | o | o | X | o | X |
| M15 | X | o | X | o | o | X | o | o |
| M16 | o | X | o | X | o | o | X | o |
| M17 | o | o | X | o | X | o | o | X |
| M18 | X | X | o | o | o | o | X | o |
| M19 | o | X | X | o | o | o | o | X |
| M20 | X | X | X | o | o | X | X | o |
| M21 | o | X | X | X | o | o | X | X |
| M22 | X | X | X | o | X | X | X | X |
| M23 | X | o | X | o | o | o | o | X |
| M24 | X | o | o | o | o | X | X | o |
| M25 | o | X | o | o | o | o | X | X |
| M26 | X | X | X | X | o | X | X | X |
| M27 | X | o | X | o | X | X | o | X |

Fig. 3

INVENTORS
WILLIAM DE LISLE
RAYMOND FRYER
BY F. I. Sullivan
ATTORNEY

INVENTORS
WILLIAM DE LISLE
RAYMOND FRYER
BY F. L. Sullivan
ATTORNEY

DATA TRANSMISSION SYSTEM WITH ERROR CORRECTION CAPABILITIES UTILIZING MAXIMUM AND NON-MAXIMUM LENGTH SEQUENCE REGISTERS FOR ENCODING AND DECODING

Filed April 14, 1960 4 Sheets-Sheet 4

INVENTORS
WILLIAM DE LISLE
RAYMOND FRYER
BY F. L. Sullivan
ATTORNEY

United States Patent Office 3,123,803
Patented Mar. 3, 1964

3,123,803

DATA TRANSMISSION SYSTEM WITH ERROR CORRECTION CAPABILITIES UTILIZING MAXIMUM AND NONMAXIMUM LENGTH SEQUENCE REGISTERS FOR ENCODING AND DECODING

William E. De Lisle, Buffalo, and Raymond G. Fryer, Williamsville, N.Y., assignors to Sylvania Electric Products Inc., a corporation of Delaware Filed Apr. 14, 1960, Ser. No. 22,280
13 Claims. (Cl. 340—146.1)

This invention is concerned with electronic data processing and communication systems, and particularly with the correction of transmission errors in such systems.

In pulse coded digital communication and data processing systems having either radio or closed circuit linkage, intelligence is transmitted and processed in the form of electric or electromagnetic impulses. For example, in binary coded communication systems messages may be comprised by the presence or absence, or by variations in the amplitude or polarity of signals representing the ONES or ZEROS of a binary code. The reliability of these digital systems is affected by the extent to which noise and other interference distorts the impulse signals during transmission so that ONES are mistaken for ZEROS and vice versa or to which phenomena such as momentary fading of radio frequency carriers at times delete digits or groups of digits from the attempted communication.

During the past ten years considerable mathematical analysis and research and development activity have been devoted to the problem of discovering and correcting these errors in received messages. Three basic approaches have been followed: the use of "code books" etc. at the receiver to verify what the incoming message should be; majority testing of redundant algebraic relationships amongst the digits of the received message to recreate the digit sequence of the original message; and, various parity checking techniques. Co-pending patent applications Serial No. 727,103, filed April 8, 1958, and Serial No. 842,549, filed September 24, 1959, now Patent No. 3,093,707, may be consulted for analyses of the present state of the art in this area and typical examples of the previously mentioned approaches to solution of the problem.

These prior art techniques have proved effective, but have generally followed a digit-by-digit approach to the solution of independent errors. As a practical matter, however, the errors in digital communications in many types of systems do not occur with relative independence. For example, impulse noise picked up on telephone lines, power line surges in station equipment, complex noise characteristics in amplifiers, atmospheric fading, finite specks of dust and other particles or faulty spots on magnetic tape, etc. generally cause drop-outs of successive digits or series bursts of erroneous digits.

Some of the previously referenced error correcting systems could be adapted to correct bursts of adjacent errors within certain limitations but only at the expense of serious redundancy, for example as much as three to one, in word length. Co-pending U.S. patent application Ser. No. 16,278, filed March 21, 1960, and also assigned to Sylvania Electric Products Inc., discloses an error correcting technique, however, which corrects burst type transmission errors with a minimum of message redundancy. An object of this invention is to povide an effective implementation of this technique. Another related object is to provide an improved data transmission system.

In one illustrative embodiment, the invention accomplishes these objects with an error correcting system which features a parity digit generator performing an encoding function at a transmitting station and a similar parity digit generator at a receiving station. The first of these generators produces a parity word or check word, of several binary digits, each individual digit of which is a binary sum of several of the information bits to be transmitted. This check word is then transmitted with the information digits. At the receiving station, the second parity digit generator produces a parity word which indicates the *pattern* of the error burst and the *location* of this error burst, if such an error burst occurs within the received word. Once the *pattern* and the *location* of the errors have been determined, correction is accomplished by modulo two addition of the error pattern digits and the erroneous message digits at the proper location within the message.

As will be explained in the following discussion of this illustrative example of an error correcting system embodying the invention, the width of the error burst which may be corrected is a functon of the number of parity digits employed. In the typical example to be described, a message word of twenty-seven information digits is corrected for error bursts up to three digits wide with the addition of only eight parity digits. The relative number of parity digits required in proportion to information digits decreases significantly with the length of the word thus making it possible to provide transmission systems wherein information words of considerable length can be transmitted with very low redundancy and high reliability. This technique has applicability not only in point-to-point communication systems but also to devices such as computer input-output equipment where it can replace duplicate files of magnetic tape for error correcting purposes, provide a check for complete sets of punched card files by adding a few cards to the stack, compensate for worn gears in mechanical coders, etc.

Other features, embodiments, modifications, and uses for the invention will be apparent from the following description of the illustrative system previously referred to and reference to the following drawings, wherein:

FIG. 1 is a Table of Check Word Sequences;

FIG. 2 is a Decoding Parity Check Table;

FIG. 3 is an Encoding Parity Check Table;

Figure 4:
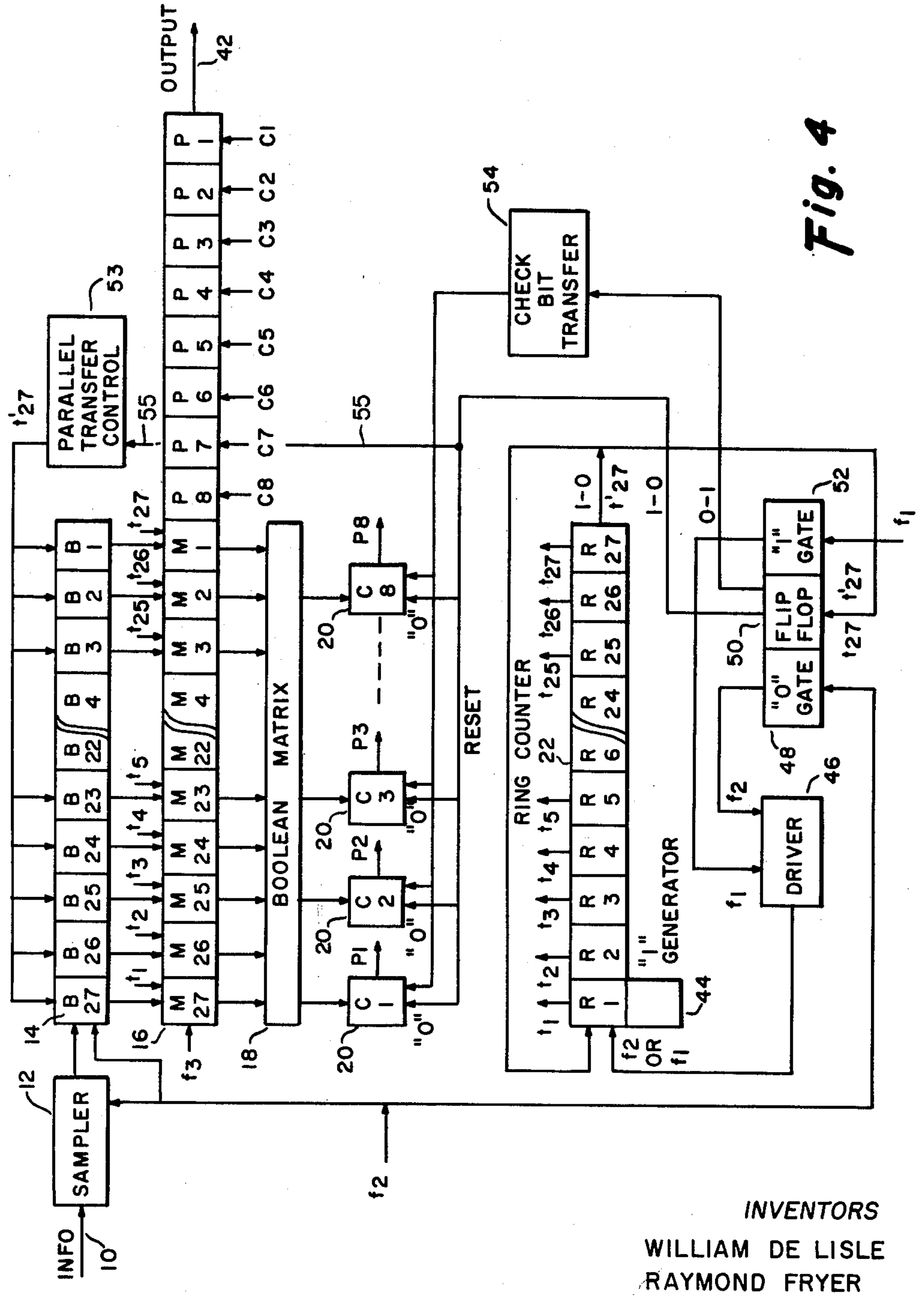
FIG. 4 is a block diagram of an error-correcting encoder.

To relieve this specification of undue theoretical analysis, a generalized description of the invention and its illustrative embodiment will be presented. A thoroughly comprehensive analysis of its theoretical and mathematical aspects is available in U.S. Patent application Ser. No. 16,278, previously identified and the references cited therein.

As has been explained, a principal feature of the invention is its ability to correct bursts of errors in digital communications. This is accomplished by adding to the text of the original information digits a series of parity digits and subsequently decoding them in a specialized manner. The encoding logic which produces the parity digits is adapted to perform a series of modulo two additions of the individual information digits in various combinations so that a parity word is formed.

A specified different parity checking procedure performed on all of the received digits produces a parity check word at the decoder. The procedure by which this parity word is obtained will be explained later in more detail, but a characteristic feature of the invention is the manner in which the check word sequences of FIG. 1 are generated in the decoder of the system by a combination of two pulse shifting registers, one having maximum length sequence feedback connections and the other having non-maximum length feedback connections.

Maximum length shift register sequences are thoroughly discussed in U.S. patent application Ser No. 16,278, previously referred to, and the references cited therein. In brief, the maximum sequence generator is a shift register of $n$ stages having appropriate feedback connection from later stages back, through a modulo two adder, to its first stage so that the word represented by the digit content of its component stages changes for each shift pulse applied to the register and no word is repeated until the maximum number of words possible ($2^n-1$ because the case of all ZEROS is avoided) has been produced. Non-maximum length sequences are any sequences which are not maximum length sequences. The non-maximum length sequence generator referred to in this description is a shift register of $n$ stages having direct feedback connection from its final to its first stage so that, in response to shift pulses, the $n$ stage register produces only $n$ words before repeating itself. We may refer to this particular non-maximum length sequence generator as a ring counter. In the table of FIG. 1, the sets of seven three-digit sequences represent the $2^3-1=7$ distinct stages of the maximum length sequences at each shifting operation.

In the embodiment of the invention under present discussion, these two types of sequences are combined as sub-words to form a complete parity word ($k$ digits long) and are cycled through their respective disjoint periods to provide a maximum number of possible check words without repeating the same combination of individual digits. The sub-word $k'$ digits long (FIG. 2) produced by the non-maximum length sequence is used first to recognize an error pattern, and the sub-word $k''$ (FIG. 2) digits long produced by a maximum length sequence feedback connection is then used in combination with the non-maximum length word to provide an error location word which is cycled through all of its possible permutations in unison with circulation of the received word, through its own register, until location of the error pattern, previously detected, has been established. At this point the erroneous digits are corrected by simple modulo two addition (binary add without carry, represented by the smybol $\oplus$ in the equations to follow), of the error pattern digits to the message digits in error.

For discussion purposes, we shall refer to the Table of Check Word Sequences of FIG. 1 as the decoder. However, the properties used for the construction of the table in FIG. 1 provide an ingenious method for incorporating into the equipment all the information in the table without actually having to store the entire table.

A suitable procedure for applying the principles of Fire's invention to the correction of error bursts in digital communications of a given word length follows:

(I) Provide a Table of Check Word Sequences wherein:

(*a*) Each digit position of a transmitted word of the length desired (including information and parity digits) has assigned to it a separate combination of the available check word digits, i.e. a separate check word;

(*b*) These separate combinations each comprise two subsets one of which may be derived from a shift register having maximum length sequence feedback connections and the other of which may be derived from a shift register having non-maximum length sequence connections;

(*c*) The maximum length sequence register has a number of stages ($k''$) equal to the width in number of digits ($n$) of error correcting capability desired; and (*d*) The non-maximum length sequence register has a width in number of stages ($k'$) which is a function of the number of stages of the maximum length sequence register. In general, the numbers $k'$ and $k''$ should be relatively prime to insure a maximum number of check word sequences, and the number of stages of the non-maximum length sequence register should be the minimum number required to insure that it be capable of accommodating every possible combination of erroneous digits desired to be corrected without repeating its data content in less than $k'$ shifts.

Such a table is shown in FIG. 1 wherein a total of thirty-five digit positions are each accorded, within various permutations of an eight bit check work ($k$), a different combination of digits. This table provides for correcting up to three adjacent errors in the following combinations:

Column A—single errors (X)
Column B—adjacent double errors (XX)
Column C—three bit wide double errors (XOX)
Column D—triple adjacent errors (XXX)

The various blocks of digits which comprise the table indicate that it has been constituted by a series of relationships to a three digit wide maximum length sequence and a five digit wide non-maximum length sequence operating each with a different periodicity. The interrelation between the A, B, C, and D sequences is established as follows: $B_1=A_1\oplus A_2$; $C_1=A_1\oplus A_3$; and $D_1=A_1\oplus A_2\oplus A_3$.

(II) Derive from the Single Error Decoding Table, A(X) of FIG. 1, a Parity Bit Encoding Table in the following manner:

(*a*) Assign each column of A(X) to one of the ($k$) parity check digits;

(*b*) Assign ($k$) rows of A(X) to the ($k$) parity check digits so that an X occurs at the intersection of column $i$ and row $i'$; and (*c*) Assign the remaining rows to the information positions in any manner.

Such a Parity Bit Encoding Table is shown in FIG. 2.

(III) Produce a set of linear simultaneous equations for the individual digits of the parity word by indicating modulo two addition of the positions checked down the columns under each of these digits (P1–P8 in the table of FIG. 2), ignoring the check at the intersection of row and column assigned to the *same* parity digit. In the illustrative table of FIG. 2, this results in the following series of equations:

(1) $P_1=P_6\oplus M_3\oplus M_8\oplus M_{13}\oplus M_{18}\oplus M_{23}$ (2) $P_2=P_7\oplus M_4\oplus M_9\oplus M_{14}\oplus M_{19}\oplus M_{24}$ (3) $P_3=P_8\oplus M_5\oplus M_{10}\oplus M_{15}\oplus M_{20}\oplus M_{25}$ (4) $P_4=M_1\oplus M_6\oplus M_{11}\oplus M_{16}\oplus M_{21}\oplus M_{26}$ (5) $P_5=M_2\oplus M_7\oplus M_{12}\oplus M_{17}\oplus M_{22}\oplus M_{27}$ (6) $P_6=P_2\oplus P_4\oplus P_5\oplus M_1\oplus M_3\oplus M_4 \oplus M_5\oplus M_8\oplus M_{10}\oplus M_{11}\oplus M_{12}\oplus M_{15}\oplus M_{17} \oplus M_{18}\oplus M_{19}\oplus M_{22}\oplus M_{24}\oplus M_{25}\oplus M_{26}$ (7) $P_7=P_3\oplus P_5\oplus P_6\oplus M_2\oplus M_4\oplus M_5 \oplus M_6\oplus M_9\oplus M_{11}\oplus M_{12}\oplus M_{13}\oplus M_{16}\oplus M_{18} \oplus M_{19}\oplus M_{20}\oplus M_{23}\oplus M_{25}\oplus M_{26}\oplus M_{27}$ (8) $P_8=P_1\oplus P_4\oplus P_6\oplus P_7\oplus M_3\oplus M_5 \oplus M_6\oplus M_7\oplus M_{10}\oplus M_{12}\oplus M_{13}\oplus M_{14}\oplus M_{17} \oplus M_{19}\oplus M_{20}\oplus M_{21}\oplus M_{24}\oplus M_{26}\oplus M_{27}$ (IV) Solve these equations for the parity digit positions in terms of the information digits only to provide a Parity Digit Encoding Table. The preceding equations may be so minimized, to provide the Encoding Table of FIG. 3, in the following manner.

It is necessary to solve for each $P_i$ ($i=1, 2, \ldots, 8$) in terms of only the $M_j$ ($j=1, 2, \ldots, 27$). In the above equations $P_4$ and $P_5$ are already in the required form. Hence, we must solve for $P_1$, $P_2$, $P_3$, $P_6$, $P_7$, and $P_8$. Coefficients are reduced to modulo $-2$, i.e., an even number is equal to ZERO and an odd number is equal to ONE.

Substituting for $P_4$ and $P_5$ from Equations 4 and 5, and putting all the remaining $P_i$ on the left side, one gets:

$$(1a) \quad P_1 \oplus P_6 = M_3 \oplus M_8 \oplus M_{13} \oplus M_{18} \oplus M_{23}$$

$$(2a) \quad P_2 \oplus P_7 = M_4 \oplus M_9 \oplus M_{14} \oplus M_{19} \oplus M_{24}$$

$$(3a) \quad P_3 \oplus P_8 = M_5 \oplus M_{10} \oplus M_{15} \oplus M_{20} \oplus M_{25}$$

$$(6a) \quad P_2 \oplus P_6 = M_2 \oplus M_3 \oplus M_4 \oplus M_5 \oplus M_6 \oplus M_7 \oplus M_8 \oplus M_{10} \oplus M_{15} \oplus M_{16} \oplus M_{18} \oplus M_{19} \oplus M_{21} \oplus M_{24} \oplus M_{25} \oplus M_{27}$$

$$(7a) \quad P_3 \oplus P_6 \oplus P_7 = M_4 \oplus M_5 \oplus M_6 \oplus M_7 \oplus M_9 \oplus M_{11} \oplus M_{13} \oplus M_{16} \oplus M_{17} \oplus M_{18} \oplus M_{19} \oplus M_{20} \oplus M_{22} \oplus M_{23} \oplus M_{25} \oplus M_{26}$$

$$(8a) \quad P_1 \oplus P_6 \oplus P_7 \oplus P_8 = M_1 \oplus M_3 \oplus M_5 \oplus M_7 \oplus M_{10} \oplus M_{11} \oplus M_{12} \oplus M_{13} \oplus M_{14} \oplus M_{16} \oplus M_{17} \oplus M_{19} \oplus M_{20} \oplus M_{24} \oplus M_{27}$$

Adding (7*a*) and (8*a*), one gets:

$$(7c) \quad P_1 \oplus P_3 \oplus P_8 = M_1 \oplus M_3 \oplus M_4 \oplus M_6 \oplus M_9 \oplus M_{10} \oplus M_{12} \oplus M_{14} \oplus M_{18} \oplus M_{22} \oplus M_{23} \oplus M_{24} \oplus M_{25} \oplus M_{26} \oplus M_{27}$$

Now, (3*a*) added to (7*c*) gives:

$$(1c) \quad P_1 = M_1 \oplus M_3 \oplus M_4 \oplus M_5 \oplus M_6 \oplus M_9 \oplus M_{12} \oplus M_{14} \oplus M_{15} \oplus M_{18} \oplus M_{20} \oplus M_{22} \oplus M_{23} \oplus M_{24} \oplus M_{26} \oplus M_{27}$$

Adding (1*a*) and (1*c*) gives:

$$(6c) \quad P_6 = M_1 \oplus M_4 \oplus M_5 \oplus M_6 \oplus M_8 \oplus M_9 \oplus M_{12} \oplus M_{13} \oplus M_{14} \oplus M_{15} \oplus M_{20} \oplus M_{22} \oplus M_{24} \oplus M_{26} \oplus M_{27}$$

Adding (6*c*) and (6*a*) gives:

$$(2c) \quad P_2 = M_1 \oplus M_2 \oplus M_3 \oplus M_7 \oplus M_9 \oplus M_{10} \oplus M_{12} \oplus M_{13} \oplus M_{14} \oplus M_{16} \oplus M_{18} \oplus M_{19} \oplus M_{20} \oplus M_{21} \oplus M_{22} \oplus M_{25} \oplus M_{26}$$

Adding (2*a*) and (2*c*) gives:

$$(7d) \quad P_7 = M_1 \oplus M_2 \oplus M_3 \oplus M_4 \oplus M_7 \oplus M_{10} \oplus M_{12} \oplus M_{13} \oplus M_{16} \oplus M_{18} \oplus M_{20} \oplus M_{21} \oplus M_{22} \oplus M_{24} \oplus M_{25} \oplus M_{26}$$

Adding (7*a*) to (6*c*) plus (7*d*) gives:

$$(3d) \quad P_3 = M_2 \oplus M_3 \oplus M_4 \oplus M_8 \oplus M_{10} \oplus M_{11} \oplus M_{13} \oplus M_{14} \oplus M_{15} \oplus M_{17} \oplus M_{19} \oplus M_{20} \oplus M_{21} \oplus M_{22} \oplus M_{23} \oplus M_{26} \oplus M_{27}$$

And finally, adding (3*d*) to (3*a*) gives:

$$(8d) \quad P_8 = M_2 \oplus M_3 \oplus M_4 \oplus M_5 \oplus M_8 \oplus M_{11} \oplus M_{13} \oplus M_{14} \oplus M_{17} \oplus M_{19} \oplus M_{21} \oplus M_{22} \oplus M_{23} \oplus M_{25} \oplus M_{26} \oplus M_{27}$$

(V) Provide, for the instrumentation of the encoder, a Boolean matrix embodying the Encoding Table of FIG. 3.

(VI) Provide for the decoder a similar matrix in reverse direction but including, instead of ignoring, the intersection of rows and columns identified by the same parity digit designation as in FIG. 2. This last step will result in a series of ZEROS for a decoder check word if there have been no transmission errors and a ONE in appropriate digit positions to indicate errors.

(VII) Accept the message if the decoder generated parity word is all ZEROS.

(VIII) Cycle the parity sub-word generators to determine error pattern and location, in a manner to be explained, if the decoder parity word contains one or more ONES.

(IX) Correct the located errors and accept the message.

Figure 5:
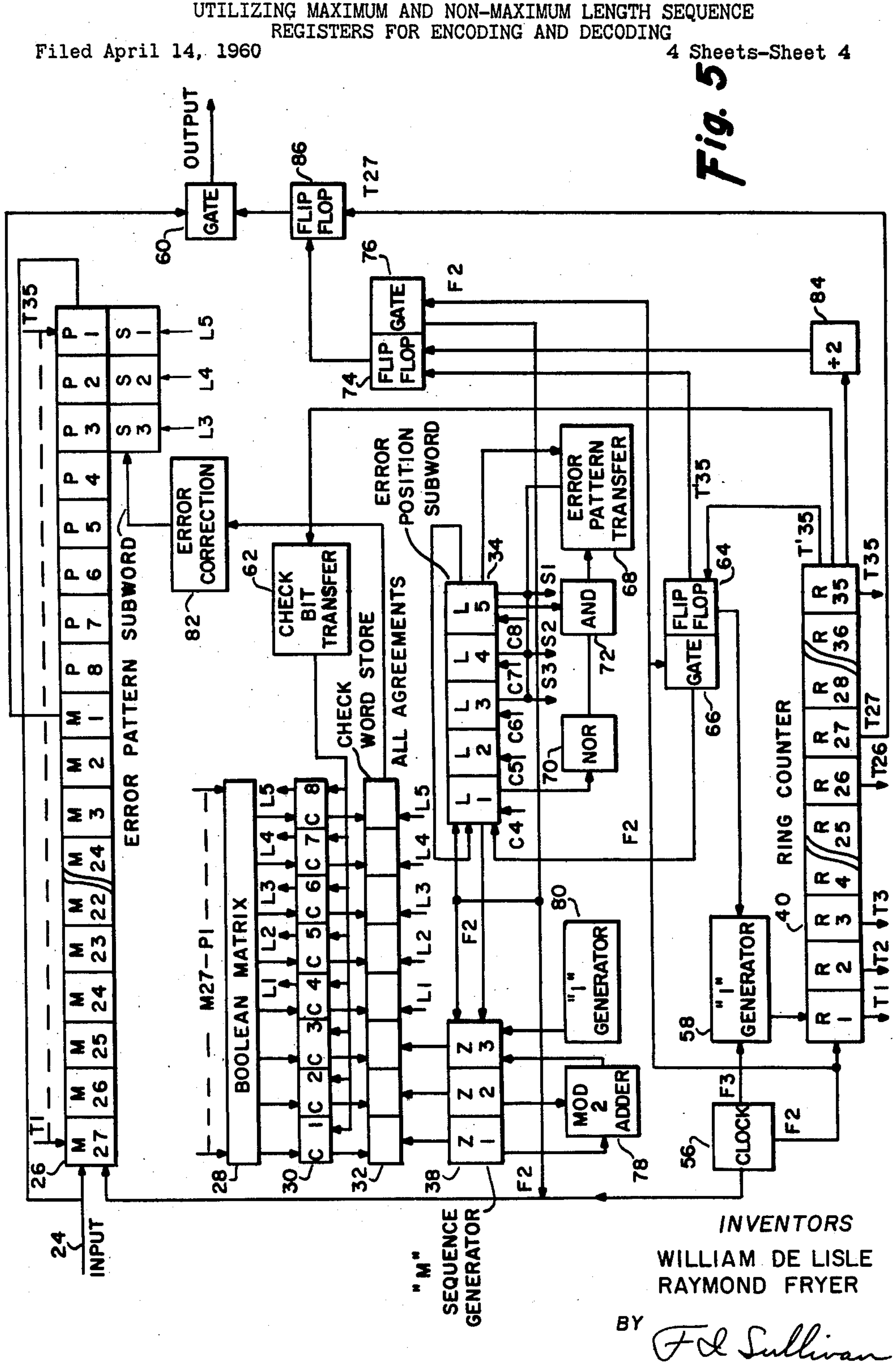
FIG. 5 is a block diagram of a decoder, illustrating the invention.

An illustrative instrumentation system for encoding messages of a twenty-seven binary digit length and decoding them with a capability of correcting errors in bursts up to three digits wide is illustrated in FIGS. 4 and 5.

The encoder of FIG. 4 includes: a source 10 of message information; a sampler 12 for converting this data into a series of occurrences and non-occurrences of synchronized electrical impulses representing the ONES and ZEROS of a binary coded information system; a twenty-seven digit buffer register 14 arranged to accept data in serial form from the sampler 12 and store it in parallel stages B1–B27; a logic line 16 in the form of a register having thirty-five stages (M1–M27 and P1–P8) for storing the message digits while parity digits are generated and for arranging the sequence of parity and message digits for ultimate transmission; a matrix 18 including the necessary Boolean circuitry for minimizing the amount of modulo two addition which must be performed to implement the encoding process; a series of flip-flop devices 20 having complementing inputs from the matrix 18 so as to have the capability of performing the modulo two additions required to generate the parity digits P1–P8; and, a ring counter 22 for sequencing the operations of the encoding process.

The decoder of FIG. 5 includes an input 24 whence the received message and parity digits are derived; a pulse shifting register 26 for storing these digits during the decoding process; a Boolean matrix 28 for implementing the decoding operation; a parity digit generator 30 including a series of flip-flops C1–C8 each having a complementing input from the Boolean matrix 28 so as to permit them to perform the modulo two addition required to form a decoder "check word"; a check word store 32; an error position store 34; an error pattern store 36; an error location generator 38; and, a ring counter 40 for sequencing the operations of the decoder.

*Encoding Operation*

In the operation of the encoder (FIG. 4) timing inputs (provided by a suitable clock system, not shown) are provided at sequences of *f*1, *f*2, and *f*3. *f*2 is the information input bit rate, e.g. 100 bits per second;

$$f3 \text{ is equal to } \frac{35}{27} f2$$

so that an output character (twenty-seven information bits plus eight check bits) may be driven serially from the register 16 during the same time interval that an input character (twenty-seven information bits only) enters the register 14; *f*1 provides pulses in a cycle greater than 35 *f*3 so that a complete parity check involving serial operation on each one of thirty-five digits may be accomplished in the period between the output of the last character in a message word shifted from register 16 via output terminal 42 and the first bit of the next character without changing the output bit rate.

The message information arriving at terminal 10 is sampled at the bit rate (*f*2) by the sampler 12 and stored in the buffer line. At this time, a ONE produced by generator 44 is inserted into the first stage R1 of ring counter 22 and is driven, at the bit rate, by *f*2 pulses transmitted to the ring counter driver 46 via the ZERO gate 48 of a flip-flop device 50 which is assumed to be in ZERO condition.

After twenty-seven *f*2 pulses, at time *t*'27 when the register 14 has been loaded with the twenty-seven digits of the message character, the ONE moving down the sequential stages of ring counter 22 is shifted from its final stage R27. This ZERO to ONE transition complements the flip-flop 50 to its ONE condition, thereby inactivating its ZERO gate 48 and energizing its ONE gate 52 and also RESETTING the parity check flip-flops 20 to ZERO condition and transferring the message digits from the buffer register 14 to the logic line 16 via operation of parallel transfer control 53 energized via control line 55.

With the opening of the ONE gate 52 and closing of the ZERO gate 48, the driver 46 drives the ring counter 22 at an *f*1 rate and, as it drives the ONE which has been re-inserted into its first stage R1 down the counter, produces serial pulses at the outputs *t*1–*t*27. Each of these pulses is consecutively applied to the digits M27–M1 in the logic line 16 and seeks coincidence with a ONE stored in the respective logic line stage to which they are connected. When such coincidence occurs, a pulse is transmitted through the matrix 18 to the appropriate flip-flop 20 which the encoding system requires for the generation of the appropriate one of the parity digits P1–P8 concerned. The configuration of this matrix is established by reference to the encoding table of FIG. 2 in accordance with the procedure previously explained.

When the ONE in the ring counter reaches stage 27 this second time, the flip-flop 50 is again complemented, this time to its ZERO condition. This transition inactivates the ONE gate 52 and energizes the ZERO gate 48. It also activates the check bit transfer control 54 to cause the flip-flops 20 containing the parity digits to transfer them to the appropriate stages P1–P8 in the logic storage line 16.

The sequence is now repeated with $f3$ pulses overlapping $f2$ pulses so that the shift register 16 is cleared of the digit sequence to be transmitted via output 42 as the buffer register 14 is loaded with message digits obtained from the sampler 12.

*Decoding Operation*

In the operation of the decoder (FIG. 5) a suitable clock 56 provides timing pulses as follows: F1, the bit rate of the received information; F2, the processing rate of the decoder which may be approximately 100 F1; and, F3 which is the "received word" rate, equal to $F1/35$.

In put data arriving at terminal 24 is received sequentially and shifted into the various stages of register 26 at an F1 bit rate. After the thirty-five bits of word data (parity digits P1–P8 and message digits M1–M27) have been received and stored, an F3 pulse occurs.

The F3 pulse causes the ONE generator 58 to insert a ONE into the first stage R1 of ring counter 40. This counter is driven by F2 pulses; and, as the ONE is circulated through it, pulses at T1–T35 are generated at the individual outputs of its thirty-five stages. As each one of these T1–T35 pulses is generated it seeks coincidence with a ONE in the individual stage of register 26 to which it is connected. When such coincidence occurs, a pulse is sent to the appropriate flip-flop C1–C8 of the parity digit generator 30 via Boolean matrix 28. This matrix has been arranged, in the manner previously explained, to accomplish the required modulo two addition for producing the decoder check word by connecting the various message and parity digits contained in the register 26 to the complementing inputs of the individual flip-flops C1–C8 of the parity word generator 30. If the check word thus generated is all ZEROS, no errors have been detected in the received word and gate 60 is energized to accomplish readout of the message digits M1–M27 from the register 26.

Upon the generation of pulse T35, if there are any ONES instead of all ZEROS in the check word generator 30, the check bit transfer control 62 is energized to transfer the various digits of the check word from their respective flip-flops C1–C8 to corresponding stages of the check word store 32. At the same time the last five digits of the word are transferred from flip-flops C4–C8 of the generator 30 into stages L1–L5, respectively, of the error sub-word shifting register 34. At this time, the flip-flop 64 is also complemented to energize gate 66.

With gate 66 energized, pulses at rate F2 drive the register 34 until there is a ONE in position L5 and ZEROS in positions L1 and L2. When this occurs, the digits stored in stages L3, L4, and L5 are transferred, under the control of the error pattern transfer 68 responding to a combination of signals from NOR gate 70 and AND gate 72, to stages S3, S2, and S1, respectively, of the error pattern sub-word store 36, and the digits stored in stages L3, L4, and L5 are transferred to stages Z2, Z3 and Z1 respectively of the maximum length sequence generator store 38. Flip-flop 64 is, at this time, RESET by a signal from the AND gate 72 to deenergize gate 66 thereby disconnecting this source of driving pulses F2 and energizing the ONE generator 58 to insert a ONE into stage R1 of the ring counter 40. This transition of flip-flop 64 also complements flip-flop 74 to energize gate 76 and now apply the F2 driving pulses simultaneously to registers 34 and 38.

The non-maximum sequence generator 34 and maximum sequence generator 38 are now driven in unison with each other and with the register 26 at the F2 rate. Registers 34 and 26 are operating with a simple feedback connection from their final into their first stage so that their data is simply recirculating. Register 38, however, is operated with appropriate feedback connections through a modulo two adder 78 to provide a maximum sequence of digit combinations. The initial contents of the register 38 when this sequencing operation is started consists, in its stages Z1, Z2, and Z3, of the digits stored in stages L5, L3, and L4, respectively, of register 34. This transfer relationship is justified by the following truth tables.

Possible states of:

| L1 | L2 | L3 | L4 | L5 | Word Sequence (FIG. 1) |
|---|---|---|---|---|---|
| 0 | 0 | 0 | 0 | 1 | A |
| 0 | 0 | 0 | 1 | 1 | B |
| 0 | 0 | 1 | 0 | 1 | C |
| 0 | 0 | 1 | 1 | 1 | D |

Corresponding required states of:

| Z1 | Z2 | Z3 |
|---|---|---|
| 1 | 0 | 0 |
| 1 | 0 | 1 |
| 1 | 1 | 0 |
| 1 | 1 | 1 |

Therefore:

$$Z1=Z5$$
$$Z2=L3$$
$$Z3=L4$$

The combination of registers 38 and 34 is now producing the various check words of the Table of Check Word Sequences in FIG. 1. The shifting process cycles these registers through their sequence of possible words until the word they generate coincides digit for digit with the check word stored in register 32. When this coincidence occurs the error correction gate 82 is energized to cause the error pattern sub-word stored in stages S1–S3 of register 36 to be added modulo two to the contents of corresponding stages P3–P1 of the register 26. The driving pulses continue until a pulse at T35 indicates that the message word stored in register 26 has been driven full cycle and its first digit is again located in stage M1 of the register, its second digit in stage M2, etc. At this time, the ÷2 circuit 84, which was partially energized by the first pulse T35 is now fully energized and complements the flip-flop 74 thereby de-energizing gate 76 and complementing flip-flop 86 to energize the gate 60 for read-out of the message digits. Flip-flop 64 has been complemented by pulse T35 to cause another ONE to start circulating through ring counter 40 and flip-flop 86 which controls the operation of gate 60, remains energized until T27 to accommodate the shift-out of the twenty-seven digits of the corrected message from register 26.

A typical example of error correcting which features principles of this invention is as follows.

Assume: a twenty-seven digit message and a desired capability of correcting transmission errors in bursts up to three digits wide; an operating system utilizing the encoding and decoding tables and the equipments which have been described; and, the following sequence of message digits (M1–M27) at the information input to the decoder of FIG. 4.

| M1 | M2 | M3 | M4 | M5 | M6 | M7 | M8 | M9 | M10 | M11 | M12 | M13 |
|---|---|---|---|---|---|---|---|---|---|---|---|---|
| 1 | 0 | 0 | 1 | 1 | 0 | 1 | 1 | 1 | 0 | 1 | 0 | 0 |

| M14 | M15 | M16 | M17 | M18 | M19 | M20 | M21 | M22 | M23 | M24 |
|---|---|---|---|---|---|---|---|---|---|---|
| 0 | 1 | 0 | 1 | 1 | 0 | 1 | 0 | 1 | 1 | 0 |

| M25 | M26 | M27 |
|---|---|---|
| 0 | 1 | 1 |

This sequence of digits passes, via the sampler 12, to stages B1–B27 of the buffer storage 14 and thence to stages M1–M27 of the logic line 16. Here, each digit stage is pulsed sequentially by the inputs t1–t27 derived from the ring counter 22 and, in accordance with the control circuitry of the Boolean matrix 18, complements selected ones of the parity digit generating flip-flop circuits 20 if there is a 1 in each digit stage M1–M27 as it is energized.

After all twenty-seven of the message digits have been sensed and made their contribution to the generation of the parity digits, the following parity check word results:

| P1 | P2 | P3 | P4 | P5 | P6 | P7 | P8 |
|---|---|---|---|---|---|---|---|
| 1 | 1 | 0 | 1 | 0 | 0 | 1 | 1 |

These eight parity digits are transferred to stages P1–P8 of the logic line 16 and the following sequence of digits is transmitted.

| Bit No. | 1(P1) | 2(P2) | 3(P3) | 4(P4) | 5(P5) | 6(P6) | 7(P7) | 8(P8) |
|---|---|---|---|---|---|---|---|---|
| | 1 | 1 | 0 | 1 | 0 | 0 | 1 | 1 |

| Bit No. | 9(M1) | 10(M2) | 11(M3) | 12(M4) | 13(M5) | 14(M6) | 15(M7) |
|---|---|---|---|---|---|---|---|
| | 1 | 0 | 0 | 1 | 1 | 0 | 1 |

| Bit No. | 16(M8) | 17(M9) | 18(M10) | 19(M11) | 20(M12) | 21(M13) |
|---|---|---|---|---|---|---|
| | 1 | 1 | 0 | 1 | 0 | 0 |

| Bit No. | 22(M14) | 23(M15) | 24(M16) | 25(M17) | 26(M18) | 27(M19) |
|---|---|---|---|---|---|---|
| | 0 | 1 | 0 | 1 | 1 | 0 |

| Bit No. | 28(M20) | 29(M21) | 30(M22) | 31(M23) | 32(M24) | 33(M25) |
|---|---|---|---|---|---|---|
| | 1 | 0 | 1 | 1 | 0 | 0 |

| Bit No. | 34(M26) | 35(M27) |
|---|---|---|
| | 1 | 1 |

If we assume that transmission errors occur in message digits M9–M11, the thirty-five digits which comprise the data processing word arriving at the input terminal 24 of the decoder of FIG. 5 are the same as those transmitted above with the exception that bit 17 is changed from a 1 to a 0, bit 18 is changed from a 0 to a 1, and bit 19 is changed from a 1 to a 0. This represents a three digit wide error burst wherein message digits 101 are changed to 010.

If there had been no errors in the received message word, the decoder Boolean matrix 28, which embodies the decoding table of FIG. 2, would result in eight 0's in the parity check digit generating flip-flops 30. Since, however, in our example bits 17, 18, and 19 have been erroneously received as specified above, the parity word generated in the flip-flops 30 instead of being all 0's is as follows:

| P1 | P2 | P3 | P4 | P5 | P6 | P7 | P8 |
|---|---|---|---|---|---|---|---|
| 1 | 0 | 0 | 0 | 1 | 1 | 1 | 0 |

This word is transferred to the check word store 32 and its last five digits (P4–P8) are transferred into stages L1–L5, respectively, of the error position sub-word 34. This register is now shifted until its first two stages contain 0's and its final stage contains a 1. In our example its contents will then read:

| L1 | L2 | L3 | L4 | L5 |
|---|---|---|---|---|
| 0 | 0 | 1 | 1 | 1 |

The three adjacent 1's in register 34 indicate that the pattern of the error received is three adjacent erroneous digits, and these three 1's indicating this pattern are transferred to stages S1, S2, and S3 of the error pattern sub-word register 36.

The contents of stages L3, L4, and L5 are also transferred to stages Z2, Z3, and Z1, respectively, of register 38 and appropriate control circuitry is energized to cause the maximum sequence generator 38 and the non-maximum sequence generator 34 to shift in unison through all of their thirty-five possible disjoint relationships set forth in column D of FIG. 1 commencing with their initial setting of: 11100111.

After each shift the contents of these two registers 38 and 34 are compared digit for digit with the decoder parity word stored in register 32 and the contents of the register 26 is simultaneously shifted one stage to the right with a recirculating feedback connection from stage P1 to M27. When bits 17, 18, and 19 of the received word corresponding to bits M9, M10, M11 of the original message are in alignment, respectively, with stages S1, S2, and S3 of the error pattern sub-word register 36 i.e. in the original position of bits P1–P3, the combined contents of registers 38 and 34 read as follows: 10001110 which is the seventeenth check word in sequence D of FIG. 1 and also a digit-for-digit coincidence with the decoder parity check word stored in register 32.

This coincidence causes the error pattern digits in stages S1–S3 of register 36 to be added modulo two to the erroneously received digits M9, M10, and M11 thereby changing them from the pattern of 010 to their original correct form of 101. Thus, the three digit wide transmission error is corrected and the originally encoded message is derived from the decoder via the output gate 60.

An error correcting system has been described with reference to specific types of code and equipment and an illustrative example of a thirty-five digit transmission word wherein twenty-seven message digits are contained and error bursts up to three digits wide are corrected. The invention, however, has broader applicability. For example, the parity digits may be interspersed throughout the transmitted word instead of being concentrated at its beginning or end, the proportion of parity digits to message digits may be increased or decreased to provide greater or lesser error correcting capability if desired, and the message word itself may be lengthened or shortened. Also, the operation of the encoding and decoding equipment may be varied by changing the initial condition of the location sub-word, the logic and/or shift direction of the sub-word registers, the initial digital make-up of the check words, the particular relationship between A, B, C, and D words, etc. Some of these alternatives are discussed in the Fire application and references cited therein. Others will be apparent to those skilled in the art. The invention, however, is not limited to the specifics of either the present description or the references which have been cited but embraces the full scope of the following claims.

What is claimed is:

1. For an electronic digital data processing system error correcting apparatus comprising: a source of message digits; a multi-stage buffer register connected to said source; a first multi-stage pulse shifting register connected to said buffer register; a first multi-digit parity word generator; a first pulse translating matrix connecting said shifting register to said parity word generator; a first multi-stage ring counter; means independently connecting individual stages of said ring counter to individual stages of said shifting register; an output channel; means for applying a sequence of said message and said parity digits to said output channel; an input channel; input means for deriving a sequence of digits from said input channel; a second multi-stage pulse shifting register; a multi-stage error pattern subword storage register having given ones of its stages connected to given stages of said second shifting register; a second multi-digit parity word generator; a second pulse translating matrix connected between said second shifting register and said second parity word generator; a second parity word buffer register conneced to said second parity word generator; a non-maximum sequence pulse shifting register having a plurality of data stages; means connecting data stages of said non-maximum sequence register to data stages of said second parity word generator; means connecting data stages of said non-maximum sequence register to given stages of said error pattern storage register; a multi-stage maximum sequence pulse shifting register having a periodic cycle disjoint with the periodic cycle of said non-maximum sequence generator; a second multi-stage ring counter; means connecting individual stages of said second ring counter to individual stages of said second pulse shifting register; means for duplicating the data content of selected stages of said non-maximum sequence generator in selected stages of said maximum sequence generator; means for simultaneously shifting data through said second shifting register, said non-maximum sequence register and said maximum sequence register, respectively; means responsive to a given relationship of data in said non-maximum and maximum sequence registers with data in said second parity word buffer register for stopping said simultaneous shifting and causing said error pattern buffer register to add the contents of its respective stages sum-modulo-two to the contents of the stages to which they are respectively connected in said second shifting register; and, means for deriving its digital content from said second shifting register after said addition has been performed.

2. For an electronic digital data processing system having error correcting capability, a message encoder comprising: a source of message digits; a multi-stage buffer register connected to said source; a first multi-stage pulse shifting register connected to said buffer register; a first multi-digit parity word generator; a first pulse translating matrix connecting said shifting register to said parity word generator; a first multi-stage ring counter; means independently connecting individual stages of said ring counter to individual stages of said shifting register; an output channel; and, means for applying a sequence of said message and said parity digits to said output channel.

3. For an electronic digital data processing system having error correcting capability, a message decoder comprising: an input channel; input means for deriving a sequence of digits from said input channel; a second multi-stage pulse shifting register; a multi-stage error pattern subword storage register having given ones of its stages connected to given stages of said second shifting register; a second multi-digit parity word generator; a second pulse translating matrix connected between said second shifting register and said second parity word generator; a second parity word buffer register connected to said second parity word generator; a non-maximum sequence pulse shifting register having a plurality of data stages; means connecting data stages of said non-maximum sequence register to data stages of said second parity word generator; means connecting data stages of said non-maximum sequence register to given stages of said error pattern storage register; a multi-stage maximum sequence pulse shifting register having a periodic cycle disjoint with the periodic cycle of said non-maximum sequence generator; a second multi-stage ring counter; means connecting individual stages of said ring counter to individual stages of said second pulse shifting register; means for transferring data from said non-maximum sequence generator; means for simultaneously shifting data through said second shifting register, said non-maximum sequence register and said maximum sequence register, respectively; means responsive to a given relationship of data in said non-maximum and maximum sequence registers with data in said second parity word buffer register for stopping said simultaneous shifting and causing said error pattern buffer register to add the contents of its respective stages sum-modulo-two to the contents of the stages to which they are respectively connected in said second shifting register; and, means for deriving its digital content from said second shifting register after said addition has been performed.

4. For an electronic digital data processing system error correcting apparatus comprising: a source of information digits; a multi-stage buffer register connected to said source; a first multi-stage pulse shifting register connected to said buffer register; a first multi-digit parity word generator; a first pulse translating matrix connecting said shifting register to said parity word generator; a first multi-stage ring counter; means independently connecting individual stages of said ring counter to individual stages of said shifting register; an output channel; means for applying a sequence of said information and said parity digits to said output channel; an input channel; input means for deriving a sequence of digits from said input channel; a second multi-stage pulse shifting register; a multi-stage error pattern subword storage register having given ones of its stages connected to given stages of said second shifting register; a second multi-digit parity word generator; a second pulse translating matrix connected between said second shifting register and said second parity word generator; a second parity word buffer register connected to said second parity word generator; a non-maximum sequence pulse shifting register having a plurality of data stages; means connecting data stages of said non-maximum sequence register to data stages of said second parity word generator; means connecting data stages of said non-maximum sequence register to given stages of said error pattern storage register; a multi-stage maximum sequence pulse shifting register having a periodic cycle disjoint with the periodic cycle of said non-maximum sequence generator; a second multi-stage ring counter; means connecting individual stages of said second ring counter to individual stages of said second pulse shifting register; means for simultaneously shifting data through said second shifting register, said non-maximum sequence register and said maximum sequence register, respectively; and, means responsive to a given relationship of data in said non-maximum and maximum sequence registers with data in said second parity word buffer register for stopping said simultaneous shifting and causing said error pattern buffer register to add the contents of its respective stages sum-modulo-two to the contents of the stages to which they are respectively connected in said second shifting register.

5. For an electronic digital data processing system: a source of digital data; a first multi-stage pulse shifting register connected to said source; a first additional digits generator; a first pulse translating matrix connecting said shifting register to said additional digits generator; a first multi-stage ring counter; means independently connecting individual stages of said ring counter to individual stages of said shifting register; an output channel; means for applying a sequence of said digital data and said additional digits to said output channel; an input channel arranged to receive data from said output channel; input means for deriving a sequence of digits from said input channel; a second multi-stage pulse shifting register; a second additional digits generator; a second pulse translating matrix connected between said second shifting register and said second additional digits generator; an additional digits buffer register connected to said second additional digits generator; a non-maximum sequence pulse shifting register having a plurality of data stages; a multi-stage maximum sequence pulse shifting register; means for simultaneously shifting data through said second shifting register, said non-maximum sequence register and said maximum sequence register, respectively; and, means responsive to a given relationship of data in said non-maximum and maximum sequence registers with data in said second additional digits buffer register for stopping said simultaneous shifting.

6. For a digital data processing system, an encoder comprising: a source of binary message digit signals to be encoded; a pulse shifting register connected to said source and having a plurality of individual signal stages corresponding in number to the combination of a plurality of message digits and a separate plurality of parity digits; a parity digit generating circuit including a plurality of complementing input bistable circuit elements corresponding in number to said plurality of parity digit signal stages; means connecting the individual ones of said message digit signal stages in different combinations to different selected ones of said bistable elements; means for sequentially energizing the connecting means between each of said message digit stages and the complementing input bistable elements to which it is connected; and, means for transferring the signal content of each one of said bistable elements to a corresponding one of said parity digit stages.

7. The invention according to claim 6 wherein: said means for sequentially energizing includes a ring counter having a plurality of stages corresponding to the number of message digit stages in said pulse shifting register; each stage of said ring counter is connected to a corresponding one of said message digit stages; and, means is provided for processing a signal through successive stages of said ring counter thereby successively energizing said digit stage connections.

8. For a digital data processing system, binary signal processing equipment comprising: a source of binary signals; a pulse shifting register connected to said source, said register having a plurality of binary signal stages and a signal feedback connection from its final to its initial stage; an auxiliary signal register having a plurality of binary signal stages each one connected to a corresponding one of said shifting register signal stages; means for adding, sum-modulo-two, the contents of each of said auxiliary register stages to the contents of its corresponding pulse shifting register stage; a plurality of bistable circuit elements each having a complementing input; means connecting individual ones of said shifting register stages to selected ones of said complementing inputs; at least one additional multi-stage pulse shifting register having a signal feedback connection from its final to its initial stage; means for inserting binary data signals into said additional shifting register; means for insertng binary data signals into said auxiliary register stages; means for sequentially energizing said connections from said first shifting register stages to said complementing inputs; means for shifting the data signal content of said first and additional pulse shifting registers; and, means for effecting said modulo two addition when a desired relationship is achieved between the digital signal content of said at least one additional register and said signal condition of said bistable elements.

9. The invention according to claim 8 wherein said at least one additional pulse shifting register comprises two shifting registers each having a different number of signal stages.

10. The invention according to claim 10 wherein said means for sequentially energizing includes a ring counter having a plurality of stages corresponding to the number of stages in said first-mentioned pulse shifting register of claim 8, each stage of said ring counter is connected to a corresponding stage of said first-mentioned register, and means is provided for processing a signal through successive stages of said ring counter thereby successively energizing said connections to said complementing inputs.

11. Digital data processing apparatus comprising: a source of binary message digit signals to be processed; a first pulse shifting register connected to said source and having a plurality of individual signal stages corresponding in number to the combination of a plurality of message digits and a separate plurality of parity digits; a parity digit generating circuit including a plurality of complementing input bistable circuit elements corresponding in number to said plurality of parity digit signal stages; means connecting individual ones of said message digit signal stages to said complementing inputs of selected ones of said bistable elements; means for sequentially energizing the connecting means between each of said message digit stages and the complementing input bistable elements to which it is connected; means for transferring the signal content of each one of said bistable elements to a corresponding one of said parity digit stages; a communication link; means for transmitting the message and parity digit content of said first pulse shifting register over said communication link; means for receiving said transmitted digits from said link; a second pulse shifting register connected to said means for receiving, said second register having a plurality of binary signal stages and a signal feedback connection from its final to its initial stage; an auxiliary signal register having a plurality of binary signal stages each one connected to a corresponding one of said shifting register signal stages; means for adding, sum-modulo-two, the contents of each of said auxiliary register stages to the contents of its corresponding pulse shifting register stage; a plurality of bistable circuit elements each having a complementing input; means connecting individual ones of said shifting register stages to selected ones of said complementing inputs; at least one additional multi-stage pulse shifting register having a signal feedback connection from its final to its initial stage; means for inserting binary data signals into said additional shifting register; means for inserting binary data signals into said auxiliary register stages; means for sequentially energizing said connections from said first shifting register stages to said complementing inputs; means for shifting the data signal content of said first and additional pulse shifting registers; and, means for effecting said modulo two addition when a desired relationship is achieved between the digital signal content of said at least one additional register and said signal condition of said bistable elements.

12. The invention according to claim 11 wherein said at least one additional pulse shifting register comprises two shifting registers each having a different number of signal stages.

13. The invention according to claim 12 wherein: said first and said second means for sequentially energizing each include a ring counter having a plurality of stages corresponding to the number of stages in its corresponding pulse shifting register; each stage of each ring counter is connected to a corresponding stage of its respective shift register; and, means is provided for processing a signal through successive stages of said ring counters thereby successively energizing said shift register connections to said complementing inputs of said bistable elements.

References Cited in the file of this patent

UNITED STATES PATENTS 2,956,124 Hagelbarger ------------ Oct. 11, 1960

OTHER REFERENCES

Green, James A., et al.: A Digital Selective Signaling System for Mobile Radio; IRE Transactions on Vehicular Communications, April 1959, pp. 74–85.